Oct. 2, 1956 B. D. LOUGHLIN 2,765,363

SIGNAL-DETECTION SYSTEMS FOR INTERCARRIER TELEVISION RECEIVERS

Filed Oct. 18, 1951 2 Sheets-Sheet 1

INVENTOR.
BERNARD D. LOUGHLIN

BY Laurence B. Dodds

ATTORNEY

SIGNAL-DETECTION SYSTEMS FOR INTERCARRIER TELEVISION RECEIVERS

Filed Oct. 18, 1951 2 Sheets-Sheet 2

INVENTOR.
BERNARD D. LOUGHLIN
BY Laurence B. Dodds
ATTORNEY

United States Patent Office 2,765,363

Patented Oct. 2, 1956

2,765,363

SIGNAL-DETECTION SYSTEMS FOR INTERCARRIER TELEVISION RECEIVERS

Bernard D. Loughlin, Lynbrook, N. Y., assignor to Hazeltine Research, Inc., Chicago, Ill., a corporation of Illinois Application October 18, 1951, Serial No. 251,971

22 Claims. (Cl. 178—5.8)

*General*

Figure 1:
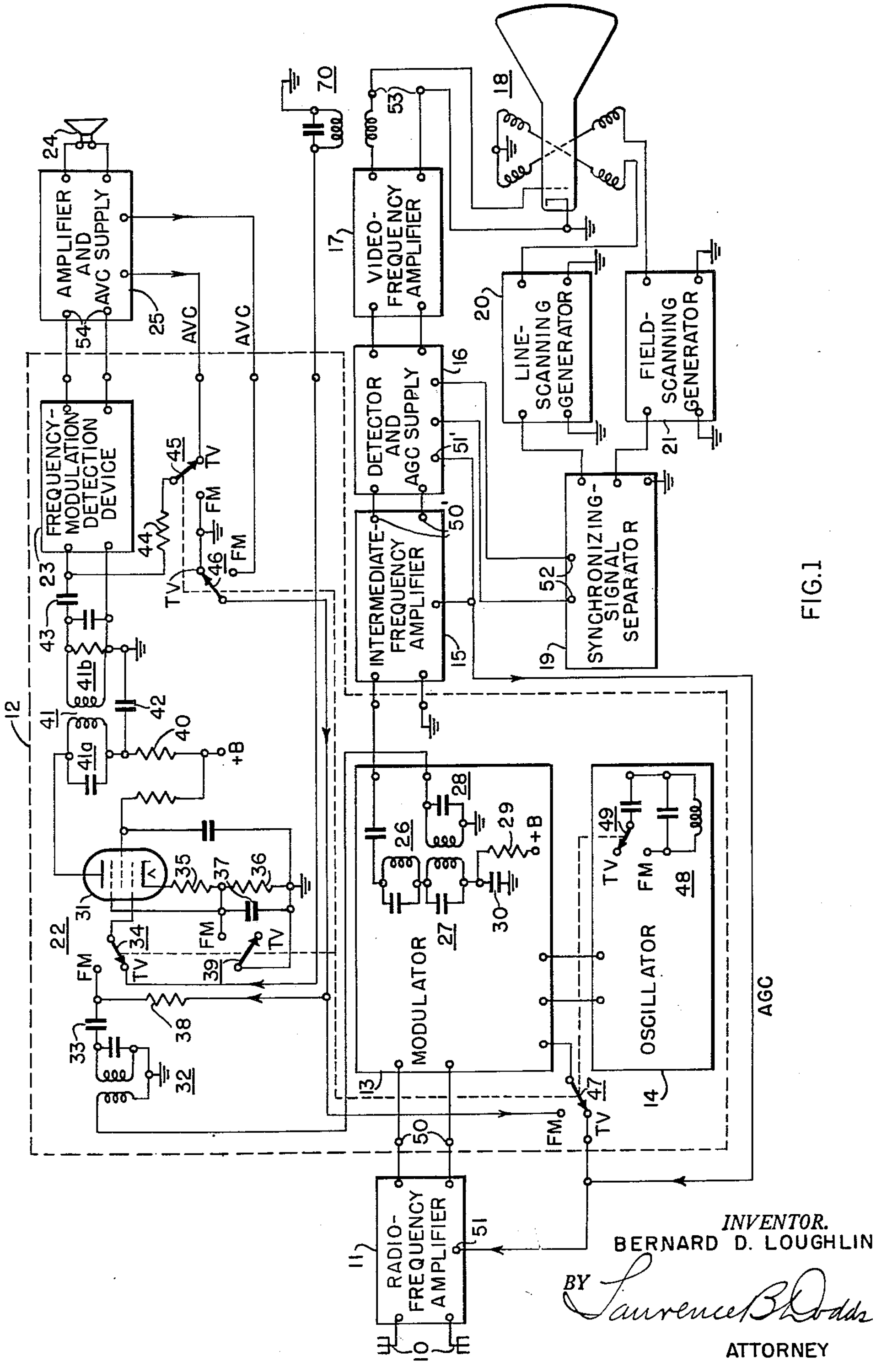

The present invention relates in general to signal-detection systems for use in intercarrier type of television receivers and is particularly directed to such systems for intercarrier type television receivers which are adapted to receive frequency-modulated wave signals, some of which are characterized by one range of frequency deviations corresponding to standard broadcast frequency modulation and others of which are characterized by a much smaller range of frequency deviations corresponding to the type of frequency modulation employed in transmitting the sound portion of a television program.

As established by the regulations of the Federal Communications Commission, a television wave signal comprises a video-frequency modulated wave signal and an audio-frequency modulated wave signal having a mean frequency displaced from the carrier frequency of the video-frequency wave signal by a frequency of 4.5 megacycles. The video-frequency wave signal is amplitude-modulated while the audio-frequency wave signal is frequency-modulated. Intercarrier type television receivers utilize the difference in the mean frequency between the aforesaid wave signals to provide in the output circuit of the video-frequency amplifier or of the second detector of the receiver a 4.5 megacycle signal frequency-modulated by the audio-frequency signal components. Such a result is conventionally obtained by causing intermediate-frequency signals related to the two modulated wave signals to heterodyne thereby producing in the circuit utilized to derive the video-frequency signal components the modulated 4.5 megacycle signal as a resultant beat signal. The audio-frequency signal components derived from the latter signal are then utilized in a sound reproducing system to reproduce the sound signals associated with the image being reproduced on the television receiver screen.

The intercarrier type television receiver has many advantages over other types of television receivers. Increased signal gain of the wave signal modulated by the audio-frequency components is obtainable by translating such signal through many of the amplifier stages through which the video-frequency signal components are also translated. As a result, fewer amplifier stages are required in the receiver for the audio-frequency components and a less expensive television receiver may be produced. In addition, by utilizing many of the stages in this manner and a common superheterodyne circuit for both wave signals, any frequency drift occurring in the local oscillator thereof will equally affect both the audio-frequency and the video-frequency signals. As a result, since the 4.5 megacycle beat signal is independent of the tuning of the receiver, the sound modulated frequency-modulation signal is normally at the proper frequency when applied to the detector. There is no tendency for the audio-frequency and video-frequency signals to drift with respect to each other, as is common in other types of television receivers, and simultaneous tuning of the video-frequency and audio-frequency wave signals becomes practicable.

There is one undesirable limitation in conventional receivers of the intercarrier type. The frequency-modulation detection circuits of the television receiver are not normally suitable for deriving the audio signals from both broadcast frequency-modulated signals and the television sound frequency-modulated signals. Essentially, the limitation arises from the difference in frequency deviation between these two types of frequency-modulated signals. In the broadcast type of frequency modulation, for 100 per cent modulation, 75 kilocycle peak-frequency deviation is utilized or, in other words, a complete deviation of 150 kilocycles peak-to-peak is utilized. In the frequency modulation of television sound signals, for 100 per cent modulation, a 25 kilocycle peak-frequency deviation or 50 kilocycle peak-to-peak frequency deviation is utilized. It is therefore apparent that if the sound reproducing stages of an intercarrier type of television receiver are designed, as in conventional receivers, to operate efficiently on the 50 kilocycle peak-to-peak frequency deviations, it becomes impractical to translate signals having 150 kilocycle peak-to-peak frequency deviations therethrough and to derive the modulation components thereof without appreciable distortion. Conversely, if the television sound-signal reproducing channel is proportioned to accommodate a 150 kilocycle peak-to-peak frequency deviation signal, then, when this channel is used to translate the 50 kilocycle peak-to-peak frequency deviation signals of a television sound signal, the efficiency with which the frequency-modulation signals are detected is low and the rejection of amplitude-modulation signals may be inadequate. As a result, in an intercarrier television receiver utilizing such a channel, some of the video-frequency and synchronizing signals will not be rejected by the frequency-modulation signal detector and will produce distortion in the form of background noise in the derived sound signals.

It is an object of the present invention therefore, to provide in an intercarrier television receiver a new and improved signal-detection system which avoids the above-mentioned limitation of the prior art arrangements.

It is a further object of the present invention to provide in an intercarrier type of television receiver a new and improved signal-detection system which is adapted to derive the modulation components of wave signals having one range of frequency deviations and of wave signals having a much smaller range of frequency deviations.

It is a further object of the present invention to provide a new and improved sound-signal detection system in an intercarrier type of television receiver adapted to derive modulation components of both television signals and broadcast frequency-modulation signals.

In accordance with the present invention there is provided, for an intercarrier type of television receiver for receiving frequency-modulated wave signals, some of which are characterized by one range of frequency deviations and others of which are characterized by a much smaller range of frequency deviations, a signal-detection system. The signal-detection system comprises means for selectively translating signals related to the differently characterized wave signals and frequency-deviation modifying apparatus for converting the translated signals having other than a predetermined range of frequency deviations into signals having a range of deviations more closely related to the predetermined range of deviations. The signal-detection system also comprises a frequency-modulation signal detector responsive to the translated signals initially having the predetermined range of deviations and to the translated signals converted to have the range of deviations more closely related to the predetermined range of deviations for deriving the modulation components therefrom.

For a better understanding of the present invention together with other and further objects thereof, reference is had to the following description taken in connection with the accompanying drawings, and its scope will be pointed out in the appended claims.

Figure 2:
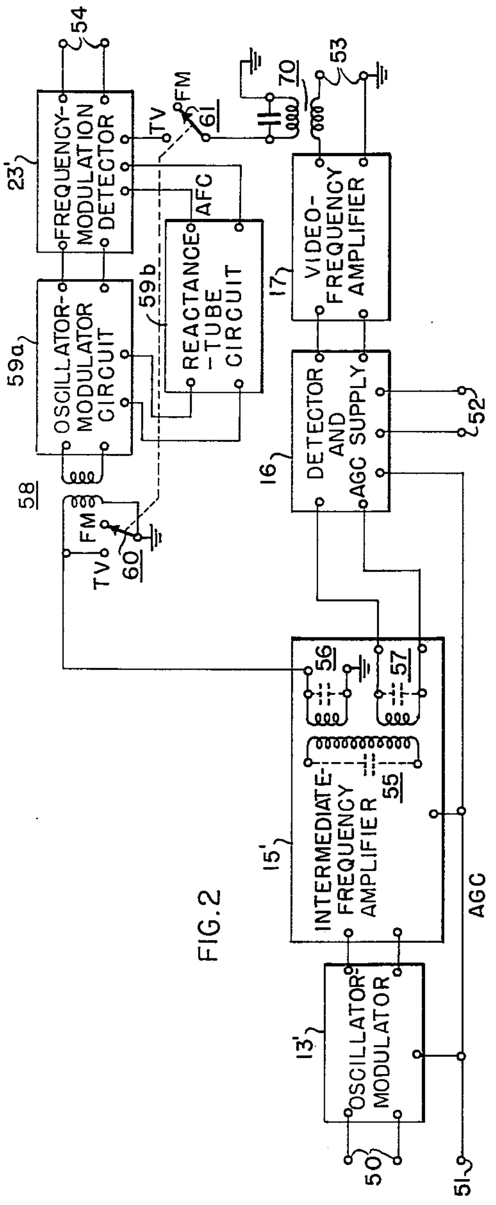
Figure 3:
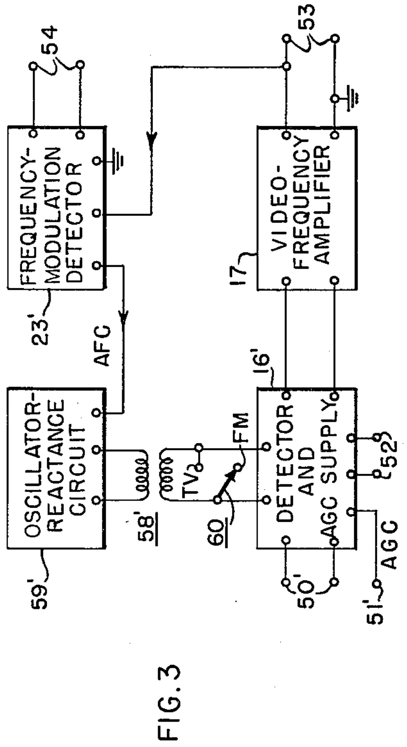

In the accompanying drawings, Fig. 1 is a circuit diagram partly schematic of a complete television receiver including a signal-detection system embodying the present invention in one form; Figs. 2 and 3 represent modified forms of the signal-detection system in accordance with the invention.

*General description of television receiver of Fig. 1*

Referring now more particularly to Fig. 1, the television receiver there represented is an intercarrier type of television receiver for receiving frequency-modulated wave signals, some of which are characterized by one range of frequency deviations and others of which are characterized by a much smaller range of frequency deviations. This receiver has an antenna system 10 connected to a radio-frequency amplifier 11 of any desired number of stages. There is coupled to the output circuit of the radio-frequency amplifier 11 in cascade in the order mentioned a modulator 13, an intermediate-frequency amplifier 15 of one or more stages, a detector and automatic-gain-control (AGC) supply 16, a video-frequency amplifier 17 of one or more stages having a transformer 70 in the output circuit thereof, and an image-reproducing device 18 of the cathode-ray tube type. Unit 13 is a component of a signal-detection system 12 to be described more fully hereinafter. An oscillator 14 is also coupled to the modulator 13. Conventional beam-deflecting windings are associated with the tube of the device 18 and the transformer 70 has a secondary circuit tuned to approximately 4.5 megacycles. A synchronizing-signal separator 19 is also coupled to the detector 16 and has output circuit coupled through a line-scanning generator 20 and a field-scanning generator 21, respectively, to the beam-deflecting windings of the tube of the device 18. When the television receiver is conditioned to receive television signals by means of a ganged switch which will be described more fully hereinafter, the output circuit of the AGC supply included in the unit 16 is connected to the input circuits of one or more of the tubes of the radio-frequency amplifier 11, the modulator 13, and the intermediate-frequency amplifier 15 is a well-known manner by means of the conductor marked AGC.

A sound-signal reproducing unit is also included in the television receiver. This unit is selectively coupled to either an output circuit of the modulator 13 or the secondary winding of the transformer 70, the connection being determined by the position of a switch in accordance with the type of signal being utilized, in a manner to be explained more fully hereinafter, and includes in cascade in the order mentioned a signal-translating stage 22, a frequency-modulation detection device 23, both of which are units of the frequency-detection system 12 to be described more fully hereinafter, an amplifier and automatic-volume-control (AVC) supply 25 and a sound-signal reproducing device 24. The device 23 is proportioned to derive the sound-signal modulation components from frequency-modulated signals having 150 kilocycle peak-to-peak frequency deviations for 100 percent modulation.

It will be understood that the various units thus far described, with the exception of the signal-detection system 12, specifically, some of the components included therein, may have any conventional construction and design. The details of such units are well known in the art rendering a further description thereof unnecessary.

*General explanation of operation of receiver of Fig. 1*

Considering briefly the operation of the receiver as a whole and assuming for the moment that the modulator 13, the signal-translating stage 22 and the detection device 23 are of conventional design, a desired modulated television wave signal is intercepted by antenna system 10. The signal is selected and amplified in radio-frequency amplifier 11 and applied to the modulator 13, also having applied thereto locally generated signals of predetermined frequency from the oscillator 14. As will be explained more fully hereinafter, the wave signal is converted in the modulator 13 to an intermediate-frequency signal which is selectively amplified in the amplifier 15 and supplied to the detector 16 wherein its video-frequency modulation components, including synchronizing-signal components, are derived. These components are amplified in the video-frequency amplifier 17 and the level of the video-frequency signal is stabilized therein. The stabilized video-frequency signal is then applied to the control electrode of the cathode-ray tube in the device 18 to modulate the intensity of the electron beam of the tube in accordance with the amplitude of the video-frequency components.

The synchronizing-signal components of the received signal are separated from the video-frequency components in the separator 19 and are used to synchronize the operation of the line-scanning generator 20 and the field-scanning generator 21. These generators supply scanning signals of saw-tooth wave form which are properly synchronized with reference to the received television signal and applied to the deflection windings in the device 18, thereby to deflect the cathode-ray beam in two directions normal to each other to reproduce the received television image.

When the circuits of the television receiver are connected by switches in a manner to be described more fully hereinafter to receive and utilize television signals, the automatic-gain-control or AGC signal derived in unit 16 is effective to control the amplification of one or more of the units 11, 13 and 15. In this manner the signal input to the detector 16 is maintained within a relatively narrow range for a wide range of received signal intensities.

The sound-signal modulated wave signal associated with the selected television wave signal is also intercepted by the antenna system 10. This signal is translated through the units 11, 13 and 15 in a manner similar to that described with reference to the television signal. In detector 16 the intermediate-frequency signal modulated by the sound signal and translated through the unit 15 heterodynes with the intermediate-frequency signal modulated by the television signal and also translated through the unit 15 to produce a 4.5 megacycle output signal which is frequency-modulated by the sound signal. This output signal is then translated through the amplifier 17, the transformer 70 and the signal-translating stage 22, in a manner more fully to be described hereinafter, and applied to the device 23 to derive therein the sound-signal modulation components which are further amplified in the amplifier 25 and reproduced by the sound-reproducing device 24.

When broadcast frequency-modulation wave signals are intercepted by the antenna system 10 and selected and amplified in the amplifier 11, these wave signals are applied to the modulator 13 and converted therein to intermediate-frequency signals modulated by the sound signals in a manner more fully to be described hereinafter. These intermediate-frequency signals are then translated through the signal translating stage 22 and the modulation components thereof are detected, amplified and reproduced in the same manner as described above with respect to the sound signals associated with the television signals.

When the broadcast frequency-modulation wave signals are being received and utilized, an automatic-volume-control or AVC signal derived in the unit 25 is effective to control the amplification of one or both of the units 13 and 22 to maintain the signal input to the detector 23 within a relatively narrow range for a wide range of received signal intensities.

*Description of signal-detection system of Fig. 1*

Referring now more particularly to the signal-detection system 12 of Fig. 1 which embodies one form of the present invention, the detection system 12 comprises means for selectively translating through different circuits signals related to the differently characterized wave signals received and selected in the radio-frequency amplifier 11. The translating means comprises the modulator 13 and the oscillator 14 coupled thereto to provide a superheterodyne circuit for the radio-frequency wave signals applied thereto from the unit 11. Coupled tuned circuits 26, 27 and 28 are included in the output circuit of the modulator 13, at least the circuit 26 and either or both of the circuits 27 and 28 being selective frequency-responsive networks for selectively and separately translating the signals related to the differently characterized wave signals. The units 13 and 14 including the circuits 26 and 27 comprise an oscillator-modulator circuit for developing from the wave signals applied thereto which have one range of frequency deviations, a signal in one of the circuits 26 or 27 having one mean frequency, for example, a frequency of 21.6 megacycles. The oscillator-modulator circuit also develops from the wave signals applied thereto which have a much smaller range of deviations than the wave signals just mentioned, a signal in the other of the circuits 26 or 27 having another mean frequency, for example, a frequency of 9 megacycles. The circuits 26 and 27 may, for instance, comprise the load impedance for a conventional vacuum tube amplifier in the modulator 13, a source of potential +B being connected to the tube through the load circuits 26 and 27 and a resistor 29. In a particular arrangement, the circuit 26 may be resonant at the frequency of 21.6 megacycles while the circuit 27 is resonant at the frequency of 9 megacycles. If stagger tuned intermediate-frequency amplifiers are employed, then the circuit 26 may be resonant at a frequency different than 21.6 megacycles. A condenser 30 is connected between one side of the network 27 and ground and provides a by-pass path for unselected signal frequencies.

The detection system 12 also comprises frequency-deviation modifying apparatus for converting those signals translated through the modulator 13 which have other than a predetermined range of frequency deviations into signals having a range of deviations more closely related to the predetermined range of deviations. Specifically, the signals having the much smaller range of deviations, namely 50 kilocycles peak-to-peak, are converted into signals having a range of deviations more closely related to a predetermined 150 kilocycle peak-to-peak range, for example, to a range of 100 kilocycles peak-to-peak. The converting apparatus comprises the signal-translating stage 22 including a vacuum tube 31. The tuned circuit 28 of the modulator 13 is coupled through a coupling transformer 32 resonant at signals having a mean frequency of 9 megacycles, a condenser 33 and a switch 34 to a control electrode of the vacuum tube 31. A self-bias is provided for the input circuit of the tube 31 by means of a pair of cathode resistors 35 and 36, the resistor 36 being by-passed for applied signal components by a condenser 37. The coupling condenser 33 and a grid-leak resistor 38 coupled to the control electrode of the tube 31 also comprise part of the biasing network therefor. A two-position switch 39 having a position TV for television and a position FM for broadcast frequency-modulation reception is connected in parallel with the resistor 36 and the condenser 37 to short-circuit these components and thereby change the biasing potential applied to the control electrode of the tube 31 when such change is desired, for example, when broadcast frequency-modulation signals are being received. By suitable positioning of the movable member of the switch 39 to the FM position the tube 31 may be arranged to be a conventional type of amplifier for translation and amplification of those signals applied thereto which have substantially the aforesaid predetermined range of frequency deviations. If the movable member of the switch 39 is in the position TV, the circuit including the tube 31 becomes a frequency multiplier circuit, specifically a frequency doubler, for the conversion of those signals applied thereto which do not have the predetermined range of frequency deviations into signals having a range of deviations more closely related to the predetermined range of deviations.

A course of potential +B is connected to the anode of the tube 31 through an output circuit thereof including a series-connected resistor 40 and a tuned circuit 41a. A condenser 42 provides a by-pass to ground across the resistor 40 and the source of potential +B for all unselected signal components. The screen electrode of the tube 31 is connected to a suitable source of potential and the suppressor electrode of the tube is connected in a conventional manner.

The detection system 12 also comprises an angular-velocity-modulation signal detector, more specifically, a frequency-modulation signal detector, responsive to those signals translated through the modulator 13 which initially have the predetermined range of deviations and also responsive to those signals translated through the modulator 13 which are converted in the signal-translating channel 22 to have a range of deviations more closely related to the predetermined range of deviations. This detector comprises the frequency-modulation detection device 23 including a driver stage and responsive to the signals just mentioned to derive the modulation components therefrom. The input circuit of the device 23 is coupled to the output circuit 41a of the stage 22 through a damped tuned circuit 41b comprising the secondary winding of a tuned coupling transformer 41 of which the primary winding includes the tuned circuit 41a, and a coupling condenser 43. A resistor 44 is coupled between the input circuit of the detector 23 and a switch point TV of a two-position switch 45 to provide bias and AVC potentials for the driver stage of the device 23. A source of conventional fast-acting AVC potential in the amplifier 25 is coupled through the switch 45 to the input circuit of the device 23 through the TV switch contact. A source of conventional delayed AVC in the amplifier 25 is coupled through a switch contact FM of a switch 46 to provide through the resistor 38 the AVC potentials for the stage 22 and through a switch contact FM of a switch 47 to provide similar potentials for the modulator 13 when broadcast frequency-modulation wave signals are being received and utilized. Such delayed AVC assists in maintaining the broadcast frequency-modulation sound signal at high intensity.

The oscillator 14 also includes a tuned circuit 48 including a two-position switch 49 coupled therein for changing the resonant frequency of the tuned circuit for television and broadcast frequency-modulation reception. The switches 34, 39, 45, 46, 47 and 49 are ganged and are utilized to arrange the circuits of the television receiver to be responsive either to television signals (TV) or broadcast frequency-modulation wave signals (FM).

*Explanation of the operation of signal-detection system of Fig. 1*

In considering the operation of the detection system 12, it will be assumed initially that the radio-frequency amplifier 11 has been tuned to select the proper type of wave signal and that the gang switches 34, 39, 45, 46, 47 and 49 have been thrown to the TV position thereof, thus conditioning the receiver to receive only television signals for application to the modulator 13, wherein they are converted, by heterodyning with a signal having a proper frequency applied to the modulator 13 from the oscillator 14, to intermediate-frequency signals having a frequency of the order of, for example, 21.6 megacycles. The tuned circuit 27 being resonant at a frequency of 9 megacycles provides a circuit having a low impedance for the 21.6 megacycle signals. The latter signals are translated through the units 15, 16 and 17 in the manner previously explained with reference to the general explanation of the operation of the receiver and the 4.5 megacycle signal, frequency-modulated by the sound signal and developed in the output circuit of the amplifier 17, is then applied through the transformer 70 and the switch 34 to the control electrode of the tube 31. When the receiver is conditioned to receive TV signals the bias developed in the control electrode-cathode circuit of the tube 31 causes this tube to act as a conventional frequency doubler. Thus, the 4.5 megacycle signal having 50 kilocycle peak-to-peak sound-modulation signals as frequency-modulation components thereof, when translated through the tube 31 becomes a 9 megacycle signal. It is understood that, by the doubling process, the 50 kilocycle peak-to-peak deviation signals are also doubled in deviation and become 100 kilocycle peak-to-peak deviation signals. The 9 megacycle intermediate-frequency signal is then translated through the coupled tuned circuits 41*a* and 41*b* and applied to the detection device 23 wherein the frequency-modulation components are derived, applied to the amplifier 25 and the sound reproduced in the unit 24.

The fast-acting automatic-volume-control (AVC) potential developed in the unit 25 in a well-known manner is applied only to the driver stage in the device 23, since the doubler circuit 22 operates at a fixed bias, to maintain the signal input to the device 23 and the amplifier 25 within a relatively narrow range for a wide range of received signal intensities and to improve the amplitude-modulation rejection of the device 23.

Referring now to the operation of the receiver when responsive to broadcast frequency-modulation signals, the amplifier 11 is tuned in a conventional manner to select the latter signals for application to the modulator 13. The oscillator 14 and the modulator 13 convert the signal applied thereto to an intermediate-frequency signal of 9 megacycles and, since the tuned circuit 26 by-passes frequencies of the order of 9 megacycles, the tuned circuit 27 then provides the load impedance in the output circuit of the modulator. The signal developed across the tuned circuit 27 is coupled to the tuned circuit 28, translated through the coupling transformer 32 and applied to the control electrode of the tube 31. The tube 31 acting as a conventional amplifier tube, since the resistor 36 and the condenser 37 are short-circuited by the switch 39, translates and amplifies the signal applied to the control electrode thereof, the amplified signal being applied through the transformer including the circuits 41*a* and 41*b* to the input circuit of the detection device 23. The modulation components of the signal are then derived in the device 23 in a conventional manner and applied to the amplifier 25 and utilized to reproduce sound in the unit 24.

The delayed AVC potential from the source 25 is applied to the translating stage 22 through the switch 45 and the resistor 38 and to the modulator stage 13 through the switch 47 to maintain the signal input to the device 23 within a relatively narrow range for a wide range of received signal intensities.

It it thus seen that the signal-detection system 12 provides, in an intercarrier type of television receiver a common means for utilizing both the sound-signal components of a television signal and also those of a broadcast frequency-modulation signal. In one mode of operation the broadcast frequency-modulation signal is translated through the modulator 13 and the tube 31 and applied to the detection device 23 in a manner conventional for frequency-modulation receivers. In another mode, in order to derive the modulation components of the sound signal portion of a television signal, the frequency deviation of the modulation component is doubled in the tube 31 thereby permitting the detection device 23 to derive the components therefrom in a more efficient manner.

The following circuit constants have been utilized in an intercarrier type of television receiver embodying the invention and are illustrative of a specific application of the invention:

| | |
|---|---|
| Tube 31 | Type 6BH6. |
| Condensers 33 and 37 | 100 micromicrofarads. |
| Resistor 35 | 68 ohms. |
| Resistor 36 | 4,700 ohms. |
| Resistor 38 | 470,000 ohms. |
| Resistor 40 | 1,000 ohms. |
| Tuned circuit 26 | resonant at 21.6 megacycles. |
| Tuned circuits 27, 28, 41*a* and 41*b*. | resonant at 9 megacycles. |
| Potential +B | 225 volts. |

*Description of modified television receiver of Fig. 2*

For some applications it may be desirable to use more of the amplifier stages available in a television receiver to amplify a broadcast frequency-modulation signal, for example, to use the video-frequency and intermediate-frequency amplifier stages. Fig. 2 represents the salient portion of a receiver capable of making more complete usage of these stages when the receiver is responsive to the broadcast frequency modulation signals.

The portions of the television receiver represented by Fig. 2 are similar to corresponding portions of the receiver represented by Fig. 1 and these corresponding components and circuit elements will be indicated by reference numerals identical to those utilized with respect to Fig. 1. Analogous circuit components or elements are identified by the same reference numerals primed. It will be understood that the circuit of Fig. 2 is adapted to be connected into the circuit of a television receiver in such a manner that suitable terminal elements of a radio-frequency amplifier such as the unit 11 of Fig. 1 are connected to the terminals 50, 50 and 51, suitable terminal elements of a synchronizing-signal separator such as the unit 19 of Fig. 1 are connected to terminals 52, 52, suitable terminals of an image-reproducing device such as the unit 18 of Fig. 1 are connected to terminals 53 and suitable terminals of an audio-frequency amplifier such as the unit 25 of Fig. 1 are connected to terminals 54.

The portion of the television receiver represented by Fig. 2 comprises, in cascade, an oscillator-modulator 13′, an intermediate-frequency amplifier 15′ of one or more stages, a detector and automatic-gain-control supply 16 and a video-frequency amplifier 17 of one or more stages. The intermediate-frequency amplifier 15′ includes, in the output circuit thereof, tuned circuits 55, 56 and 57. The circuit 55, inductively coupled to the circuits 56 and 57, may comprise at least a part of the output load impedance of a vacuum tube, the circuit 57 being coupled to the input circuit of the unit 16 while the circuit 56 is coupled through a coupling transformer 58 to an input circuit of an oscillator-modulator 59*a*. The oscillator-modulator circuit 59*a* may include a reactance tube for causing the frequency of the oscillator to deviate at a rate related to the frequency of the modulation components of the wave signals having other than a predetermined range of frequency deviations and to an extent which is a fraction of the extent of the last-mentioned deviations. The unit 59*a* comprises frequency-deviation modifying apparatus for converting the translated signals from one range of frequency deviations to a predetermined smaller range. Alternatively, as shown in Fig. 2, the reactance tube may comprise an independent circuit 59*b* coupled between an AFC output circuit of a detector 23′ and an input circuit of the unit 59*a* to control the frequency of the oscillator in the unit 59*a*. For example, the units 59*a* and 59*b* are arranged to convert signals having a frequency deviation of 150 kilocycles peak-to-peak to signals having a deviation of 50 kilocycles peak-to-peak. The primary circuit of the transformer 58 includes a switching circuit, specifically a two position short-circuiting switch 60 having switch positions TV and FM.

The tuned circuits 55, 56 and 57 together with the transformer 58 including the switch 60 comprise means for selectively translating through different circuits, namely circuit 56 or 57, signals related to the differently characterized wave signals.

The balanced frequency-modulation detector 23', which may be of a conventional type is coupled to the output circuit of the unit 59*a*, and is arranged to derive a control signal for application to the converting means, specifically the reactance tube thereof, to control the amount of deviation change effected by the unit 59*a* on the translated signals having other than the predetermined range of deviations. In particular, the unbalance voltages developed in the output circuit of the detector 23' provide fast-acting automatic-frequency-control potentials for application to the reactance tube circuit 59*b* to control the frequency of the oscillator in the unit 59*a*. An arrangement of this type is more fully described in the copending application Serial No. 788,569, filed on November 28, 1947, and entitled "Angular-Velocity-Modulated Wave-Signal Receiver, now Patent No. 2,633,527. Also, as in the receiver of Fig. 1, the detector is responsive to the translated signals initially having the predetermined range of deviations, for example, 50 kc. peak-to-peak, and to the translated signals converted to have a range of deviations more closely related to the predetermined range of deviations for deriving from the translated signal, the modulation components thereof. The detector 23' also has an input circuit coupled through a two-position switch 61 to the output circuit of the video-frequency amplifier 17, for conventional television reception. Switches 60 and 61 are ganged.

*Explanation of the operation of modified receiver of Fig. 2*

In general, the portion of the receiver represented by Fig. 2, translates television signals and the sound-signal components of television signals in a manner very similar to the similar portion of the Fig. 1 receiver. The 4.5 megacycle signal which is frequency-modulated by the sound-signal components is derived in the detector 16 and translated through the amplifier 17 and applied through the switch position TV of the switch 61 to the detector 23'. The sound-signal components are derived in the detector 23' and applied through the terminals 54 to an audio amplifier and a sound-signal reproducing device.

Broadcast frequency-modulation signals are applied to the intermediate-frequency amplifier 15' in the same manner that television signals are applied thereto. With the switches 60 and 61 in the FM position, the signals translated through the amplifier 15' are translated along the path including the tuned circuit 56 and are applied to the oscillator-modulator 59*a* wherein they are converted to intermediate-frequency signals of 4.5 megacycles. The latter signals are applied to the detector 23' to derive the modulation components therefrom. The 150 kilocycle peak-to-peak deviation of the broadcast frequency-modulation signal produces in the detector 23' a fast-acting automatic-frequency-control effect which is applied through a reactance tube circuit 59*b* to the oscillator in the unit 59*a* to limit the deviations of signals being converted in the unit 59*a* to peak-to-peak deviations of the order of 50 kilocycles. To effect this result, the unit 59*b* responds to the AFC signal to control the frequency of the oscillator in the unit 59*a* so that the frequency thereof decreases linearly as the frequency deviations increase. In this manner, the frequency detector 23' is then able faithfully to derive the modulation components from the converted signal.

Thus, it may be seen that the signal-detection system of Fig. 2 is capable of deriving the modulation-signal components from both signals having a wide range of frequency deviations and signals having a much smaller range of frequency deviations. The oscillator-modulator 59*a* under the control of a control effect derived in the detector 23' converts signals applied thereto having frequency deviations other than a predetermined range of frequency deviations into signals having a predetermined range of frequency deviations. Thus, the receiver represented by Fig. 2 is capable of utilizing television signals and broadcast frequency-modulation signals.

*Description and explanation of operation of embodiment of Fig. 3*

The portion of the television receiver represented by Fig. 3 is similar to a corresponding portion of the embodiment of Fig. 2, similar components being designated by the same reference numerals and analogous components or circuit elements by the same reference numerals primed. It will be understood that the terminals 50', 50' are adapted to couple the detector 16' to suitable output terminals of an intermediate-frequency amplifier such as the unit 15 of Fig. 1, while the terminal 51' is adapted to be coupled to AGC terminals of a radio-frequency amplifier, a modulator and an intermediate-frequency amplifier such as units 11, 13 and 15, respectively, of Fig. 1.

In the embodiment of Fig. 3 the detector 16' is adapted, as in conventional intercarrier television receivers, to develop the 4.5 megacycle sound intermediate-frequency signal when the receiver is responsive to television signals and also in cooperation with the oscillator of the unit 59' to develop a 4.5 megacycle signal when broadcast frequency-modulation signals are being received. For this reason, the oscillator of the unit 59' is coupled through the transformer 58', when the switch 60 is in the FM position, to inject a signal of such frequency that the broadcast frequency-modulation signal may heterodyne therewith in the detector 16' to produce the 4.5 megacycle signal. The latter signal is then translated through the amplifier 17 and applied to the detector 23' in a conventional manner. As in the Fig. 2 embodiment, the detector 23' is arranged to produce, by means of the unbalance voltage developed in the output thereof, a fast-acting automatic-frequency-control (AFC) effect. This effect is applied to the reactance tube circuit in the unit 59' to control the frequency of the oscillator therein so that the 4.5 megacycle frequency-modulation signal developed in the detector 16' has a maximum frequency deviation of the order of 50 kilocycles peak-to-peak.

Briefly, the system of Fig. 3 operates in a conventional manner to translate the sound signals, accompanying a television signal, to the detector 23'. However, the broadcast frequency-modulated sound signal is caused to heterodyne in the detector 16' with a signal generated in the oscillator of the unit 59' to develop a 4.5 megacycle frequency-modulated signal which is then translated through the amplifier 17 and applied to the detector 23'. The signal injected by the oscillator of the unit 59' is so controlled by the reactance tube therein, that the deviations of the broadcast frequency-modulation signal are crushed to a maximum of 50 kilocycles peak-to-peak.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; frequency-deviation modifying apparatus for converting said translated signals having other than a predetermined range of frequency deviations into signals having a range of deviations more closely related to said predetermined range of deviations; and a frequency-modulation signal detector responsive to those of said translated signals initially having said predetermined range of deviations and to said converted signals for deriving the modulation components therefrom.

2. In an intercarrier type of television receiver for receiving frequency-modulated wave signals some of which are characterized by one range of frequency deviations and others of which are characterized by a much smaller range of frequency deviations, a signal-detection system comprising: means for translating individually through separate paths signals related to the differently characterized wave signals; frequency-deviation modifying apparatus for converting said translated signals having other than a predetermined range of frequency deviations into signals having a range of deviations more closely related to said predetermined range of deviations; and a frequency-modulation signal detector responsive to those of said translated signals initially having said predetermined range of deviations and to said converted signals for deriving the modulation components therefrom.

3. In an intercarrier type of television receiver for receiving frequency-modulated wave signals some of which are characterized by one range of frequency deviations and others of which are characterized by a much smaller range of frequency deviations, a signal-detection system comprising: means including a frequency-responsive network for selectively translating through separate paths signals related to the differently characterized wave signals; frequency-deviation modifying apparatus for converting said translated signals having other than a predetermined range of frequency deviations into signals having a range of deviations more closely related to said predetermined range of deviations; and a frequency-modulation signal detector responsive to those of said translated signals initially having said predetermined range of deviations and to said converted signals for deriving the modulation components therefrom.

4. In an intercarrier type of television receiver for receiving frequency-modulated wave signals some of which are characterized by one range of frequency deviations and others of which are characterized by a much smaller range of frequency deviations, a signal-detection system comprising: an oscillator-modulator circuit for developing from said wave signals having said one range of frequency deviations a signal having one mean frequency and for developing from said wave signals having said much smaller range of frequency deviations a signal having another mean frequency and including a frequency-responsive network for selectively translating through separate paths said signals having different mean frequencies; frequency-deviation modifying apparatus for converting said translated signals having other than a predetermined range of frequency deviations into signals having a range of deviations more closely related to said predetermined range of deviations; and a frequency-modulation signal detector responsive to those of said translated signals initially having said predetermined range of deviations and to said converted signals for deriving the modulation components therefrom.

5. In an intercarrier type of television receiver for receiving frequency-modulated wave signals some of which are characterized by one range of frequency deviations and others of which are characterized by a much smaller range of frequency deviations, a signal-detection system comprising: means including a switching circuit for selectively translating through separate paths signals related to the differently characterized wave signals; frequency-deviation modifying apparatus for converting said translated signals having other than a predetermined range of frequency deviations into signals having a range of deviations more closely related to said predetermined range of deviations; and a frequency-modulation signal detector responsive to those of said translated signals initially having said predetermined range of deviations and to said converted signals for deriving the modulation components therefrom.

6. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; frequency-deviation modifying apparatus for converting said translated signals having said much smaller range of frequency deviations into signals having a range of deviations more closely related to said one range of deviations; and a frequency-modulation signal detector responsive to those of said translated signals having said one range of deviations and to said converted signals for deriving the modulation components therefrom.

7. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; a frequency-multiplier circuit for at least doubling the frequency and the range of frequency deviations of said translated signals having other than a predetermined range of frequency deviations so that said signals modified in frequency have a range of deviations more closely related to said predetermined range of deviations; and a frequency-modulation signal detector responsive to those of said translated signals initially having said predetermined range of deviations and to said signals modified in frequency for deriving the modulation components therefrom.

8. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; frequency-deviation modifying apparatus for converting said translated signals having said one range of frequency deviations into signals having a range of deviations more closely related to said smaller range of deviations; and a frequency-modulation signal detector responsive to those of said translated signals initially having said smaller range of deviations and to said converted signals for deriving the modulation components therefrom.

9. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; frequency-deviation modifying apparatus including an oscillator for developing a signal the frequency of which differs from the frequency of said translated signals, a control circuit for varying said frequency of said signal developed by said oscillator at a rate related to the frequency of the modulation components of said translated signals having other than a predetermined range of frequency deviations, and a modulator responsive to said frequency-deviated signal developed by said oscillator and said translated signals for converting said translated signals having other than a predetermined range of frequency deviations into signals having a range of deviations more closely related to said predetermined range of deviations; and a frequency-modulation signal detector responsive to those of said translated signals initially having said predetermined range of deviations and to said converted signals for deriving the modulation components therefrom.

10. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; an oscillator for developing a signal the frequency of which differs from the frequency of said translated signals; a control circuit responsive to a control signal for varying said frequency of said signal developed by said oscillator at a rate related to the frequency of the modulation components of said translated signals having other than a predetermined range of frequency deviations and for causing said signal developed by said oscillator to deviate in frequency to an extent which is a fraction of the extent of said last-mentioned deviations; a modulator responsive to said frequency-deviated signal developed by said oscillator and said translated signals for converting said translated signals having other than a predetermined range of frequency deviations into signals having a range of deviations more closely related to said predetermined range of deviations; and a frequency-modulation signal detector responsive to those of said translated signals initially having said predetermined range of deviations and to said converted signals for developing said control signal and for deriving the modulation components therefrom.

11. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; an oscillator for developing a signal the frequency of which differs from the frequency of said translated signals; a reactance circuit responsive to a control signal for varying said frequency of said signal developed by said oscillator at a rate related to the frequency of the modulation components of said translated signals having other than a predetermined range of frequency deviations and for causing said signal developed by said oscillator to deviate in frequency to an extent which is a fraction of the extent of said last-mentioned deviations; a modulator responsive to said frequency-deviated signal developed by said oscillator and said translated signals for converting said translated signals having other than a predetermined range of frequency deviations into signals having a range of deviations more closely related to said predetermined range of deviations; and a frequency-modulation signal detector coupled to said reactance circuit and responsive to those of said translated signals initially having said predetermined range of deviations and to said converted signals for developing said control signal and and for deriving the modulation components therefrom.

12. In an intercarrier type of television receiver for receiving frequency-modulated wave signals some of which are characterized by one range of frequency deviation and others of which are characterized by a much smaller range of frequency deviations, a signal-detection system comprising: means for selectively translating signals related to the differently characterized wave signals; frequency-deviation modifying apparatus for converting said translated signals having other than a predetermined range of frequency deviations into signals having a range of deviations more closely related to said predetermined range of deviations; and a frequency-modulation signal detector coupled to said apparatus and responsive to those of said translated signals initially having said predetermined range of deviations and to said converted signals for deriving therefrom the modulation components thereof and for deriving a control effect for application to said apparatus to control the amount of deviation change effected by said apparatus on said converted signals.

13. In an intercarrier type of television receiver for receiving frequency-modulated wave signals some of which are characterized by one range of frequency deviations and others of which are characterized by a much smaller range of frequency deviations, a signal-detection system comprising: means for selectively translating signals related to the differently characterized wave signals; an oscillator circuit coupled to said selectively translating means and including a reactance tube for causing the frequency of said oscillator to deviate at a rate related to the frequency of the modulation components of said translated signals having other than a predetermined range of frequency deviations and to an extent which is a fraction of the extent of said last-mentioned deviations; a detector circuit coupled in circuit with said oscillator for heterodyning said translated signals having said one range of frequency deviations with signals from said oscillator circuit to convert said translated signals having other than said smaller range of frequency deviations into signals having a range of deviations more closely related to said smaller range of deviations; and a frequency-modulation signal detector coupled to said oscillator circuit and responsive to those of said translated signals initially having said predetermined range of deviations and to said converted signals for deriving the modulation components therefrom.

14. In an intercarrier type of television receiver for receiving either one group of frequency-modulated wave signals characterized by one range of frequency deviations or another group of said signals characterized by a much smaller range of frequency deviations, a signal-detection system comprising: a circuit for supplying signals representative of the differently characterized wave signals; frequency-deviation modifying apparatus responsive to said supplied signals for modifying those thereof having other than a predetermined range of frequency deviations into signals having a range of frequency deviations closely related to said predetermined range of deviations; and a frequency-modulation signal detector coupled to said apparatus and having circuit parameters proportioned for deriving the modulation components of said translated and said modified signals substantially having said predetermined range of frequency deviations.

15. In an intercarrier type of television receiver for receiving either one group of frequency-modulated wave signals characterized by substantially a 150 kilocycle range of frequency deviations or another group of said signals characterized by substantially a 50 kilocycle range of frequency deviations, a signal-detection system, comprising: a circuit for supplying signals representative of the differently characterized wave signals; frequency-deviation modifying apparatus responsive to said supplied signals for modifying those thereof having said 50 kilocycle range of frequency deviations into signals having a range of frequency deviations closely related to said 150 kilocycle range of deviations; and a frequency-modulation signal detector coupled to said apparatus and having circuit parameters proportioned for deriving the modulation components of said translated and said modified signals substantially having said 150 kilocycle range of frequency deviations.

16. In an intercarrier type of television receiver for receiving either one group of frequency-modulated wave signals characterized by substantially a 150 kilocycle range of frequency deviations or another group of said signals characterized by substantially a 50 kilocycle range of frequency deviations, a signal-detection system comprising: a circuit for supplying signals representative of the differently characterized wave signals; frequency-deviation modifying apparatus responsive to said supplied signals for modifying those thereof having said 150 kilocycle range of frequency deviations into signals having a range of frequency deviations closely related to said 50 kilocycle range of deviations; and a frequency-modulation signal detector coupled to said apparatus and having circuit parameters proportioned for deriving the modulation components of said translated and said modified signals substantially having said 50 kilocycle range of frequency deviations.

17. In combination, a first source of signals having one frequency, a second source of signals having a frequency which is a multiple of said first frequency, an electron discharge device having an input circuit and an output circuit, means for biasing said electron discharge device to operate on a non-linear portion of its characteristic curve so as to generate harmonics of signals applied to its input circuit, the output circuit of said electron discharge device being tuned to the frequency of said second source, and switching means for connecting said input circuit to said first source or alternately to said second source.

18. In combination, a first super-heterodyne receiver having one intermediate frequency, a second superheterodyne receiver having an intermediate frequency which is a multiple of said one frequency, an amplifier tube having an output circuit tuned to said intermediate frequency of said second receiver, and having an input circuit, means for biasing said tube to operate on a non-linear portion of its characteristic curve whereby it generates harmonics of frequencies applied to said input circuit, and switching means for connecting said input circuit to said first receiver or alternatively to said second receiver.

19. In combination, a television receiver having an intercarrier, frequency modulated, sound intermediate frequency, a frequency modulation broadcast receiver having an intermediate frequency which is a multiple of said intercarrier intermediate frequency, an intermediate frequency amplifier tube having an output circuit tuned to said intermediate frequency of said broadcast receiver, and having an input circuit, means for biasing said tube to operate on a non-linear portion of its characteristic curve so as to generate harmonics of signals applied to its input circuit, and switching means for connecting said input circuit to said television receiver or alternatively to said broadcast receiver.

20. In combination, a television receiver having an intercarrier, frequency modulated, sound intermediate frequency, a frequency modulation broadcast receiver having an intermediate frequency which is a multiple of said intercarrier intermediate frequency, an intermediate frequency amplifier tube having an output circuit tuned to said intermediate frequency of said broadcast receiver, and having an input circuit, means for biasing said tube to operate on a non-linear portion of its characteristic curve so as to generate harmonics of signals applied to said input circuit, a detector connected to said output circuit, and switching means for connecting said input circuit to said television receiver or alternatively to said broadcast receiver.

21. The invention claimed in claim 20 in which an audio-frequency amplifier is connected to the detector, and a sound reproducer is connected to the audio-frequency amplifier.

22. A television and frequency modulation broadcast receiving system comprising a super-heterodyne, television receiver having an intercarrier, frequency modulated, sound intermediate frequency, a super-heterodyne, frequency modulation broadcast receiver having an intermediate frequency which is a multiple of said intercarrier, intermediate frequency, an intermediate frequency amplifier tube having an output circuit tuned to said intermediate frequency of said broadcast receiver, and having an input circuit, means for biasing said tube to operate on a non-linear portion of its characteristic curve so as to generate harmonics of signals applied to said input circuit, a frequency modulation detector connected to said output circuit, an audio-frequency amplifier connected to said detector, a sound reproducer connected to said audio-frequency amplifier, and switching means for connecting said input circuit to said television receiver or alternatively to said broadcast receiver.

References Cited in the file of this patent

UNITED STATES PATENTS

| | | |
|---|---|---|
| 2,528,222 | Foster | Oct. 31, 1950 |
| 2,591,264 | Janssen | Apr. 1, 1952 |
| 2,617,878 | Goldfus | Nov. 11, 1952 |
| 2,626,315 | Farr | Jan. 20, 1953 |
| 2,650,265 | Mountjoy | Aug. 25, 1953 |